US012798326B2

(12) United States Patent
Oh et al.

(10) Patent No.: US 12,798,326 B2
(45) Date of Patent: Nov. 17, 2026

(54) AIR CONDITIONING DEVICE AND SYSTEM FOR A VEHICLE AND A CONTROL METHOD USING THE SAME

(71) Applicants: HYUNDAI MOTOR COMPANY, Seoul (KR); KIA CORPORATION, Seoul (KR); DOOWON CLIMATE CONTROL CO., LTD., Asan-si (KR)

(72) Inventors: Hyo Geun Oh, Cheongju-si (KR); Myung Hoe Kim, Seoul (KR); Kwang Ok Han, Seoul (KR); Kwang Woon Cho, Yongin-si (KR); Su Yeon Kang, Seoul (KR); Won Jun Joung, Uiwang-si (KR); Byung Guk An, Anyang-si (KR)

(73) Assignees: HYUNDAI MOTOR COMPANY, Seoul (KR); KIA CORPORATION, Seoul (KR); DOOWON CLIMATE CONTROL CO., LTD., Asan-si (KR)

( * ) Notice: Subject to any disclaimer, the term of this patent is extended or adjusted under 35 U.S.C. 154(b) by 285 days.

(21) Appl. No.: 18/800,932

(22) Filed: Aug. 12, 2024

(65) Prior Publication Data

US 2025/0206100 A1 Jun. 26, 2025

(30) Foreign Application Priority Data

Dec. 20, 2023 (KR) ........................ 10-2023-0186909

(51) Int. Cl.
*B60H 1/00* (2006.01)

(52) U.S. Cl.
CPC ................................ *B60H 1/00671* (2013.01)

(58) Field of Classification Search
CPC ............ B60H 1/00671; B60H 1/00207; B60H 1/00021; B60H 1/00521; B60H 1/00692; B60H 1/00421; B60H 1/00464; B60H 2001/00085; B60H 2001/00235
See application file for complete search history.

(56) References Cited

U.S. PATENT DOCUMENTS

2002/0197951 A1* 12/2002 Uemura ............... B60H 1/0005
454/121

* cited by examiner

*Primary Examiner* — Jonathan Bradford
(74) *Attorney, Agent, or Firm* — Lempia Summerfield Katz LLC

(57) ABSTRACT

An air conditioning device and system for a vehicle that operates by changing an introduction direction of outdoor air provided to a heat exchanger and adjusting an amount of heat exchange between the heat exchanger and outdoor air according to a driving direction or whether a heat pump is used, and a control method using the same.

20 Claims, 10 Drawing Sheets opening of rear surface opening of front/rear surfaces opening of all surfaces

AIR CONDITIONING DEVICE AND SYSTEM FOR A VEHICLE AND A CONTROL METHOD USING THE SAME

CROSS REFERENCE TO RELATED APPLICATION

The present application claims priority of Korean Patent Application No. 10-2023-0186909 filed on Dec. 20, 2023, the entire contents of which is incorporated herein for all purposes by this reference.

BACKGROUND

Technical Field

The present disclosure relates to an air conditioning device and system for a vehicle, in which an introduction direction of outdoor air provided to a heat exchanger can be switched, and a control method using the same.

Description of the Related Art

Generally, an air conditioning device is a front air conditioning device formed such that air for cooling or heating is discharged from an outlet formed in an instrument panel at a front side of an interior of a vehicle, and thus in the case of a vehicle with a large interior space, a cooling or heating effect cannot sufficiently extend to rear seats.

Thus, in order to assist in cooling and heating performance for the rear seat, a rear seat air conditioning device or a roof-type air conditioning device installed on a roof of the vehicle to discharge air-conditioned air above a head of an occupant are being applied.

In particular, in the loop-type air conditioning device, an outdoor heat exchanger for exchanging heat with outdoor air is also installed on the roof. However, there is a limit to securing an amount of the outdoor air that should be provided to the outdoor heat exchanger in a limited space of the roof.

In addition, recently, various types of autonomous vehicles have been developed, and the autonomous vehicles are being developed to enable two-way driving, including forward and rearward directions. However, since a portion of introducing outdoor air is limited to a front side of a vehicle, the loop-type air conditioning device cannot sufficiently introduce the outdoor air that should be provided to the outdoor heat exchanger.

The foregoing is intended merely to aid in the understanding of the background of the present disclosure, and is not intended to mean that the present disclosure falls within the purview of the related art that is already known to those having ordinary skill in the art.

SUMMARY

Accordingly, the present disclosure has been made keeping in mind the above problems occurring in the related art, and the present disclosure is intended to provide an air conditioning device and system for a vehicle, which can improve operating efficiency of a heat exchanger by changing an introduction direction of outdoor air provided to the heat exchanger and adjusting an amount of heat exchange between the heat exchanger and the outdoor air according to a driving direction or whether a heat pump is used. The present disclosure also provides a control method of using the same.

According to one aspect, there is provided an air conditioning device for a vehicle, which includes a housing in which an air inlet and an air outlet are provided, the air inlet is provided as a plurality of air inlets in multiple directions, and a plurality of opening holes are formed in each air inlet. The air conditioning device also includes a heat exchange unit provided inside the housing and a door which is movably installed in the housing and in which a plurality of opening holes selectively matched to the opening holes of each air inlet according to a movement position are formed, wherein the opening holes of each air inlet or the opening holes formed in each direction of the door are formed in different numbers or different separation distances in each direction so that one or more opening holes among the plurality of air inlets are opened according to a position of the door.

The air inlets may be configured to have a different number or separation distance of the opening holes, or some air inlets may be configured to have the same number or separation distance of the opening holes.

In the door, the same number of opening holes in each direction may be formed at the same positions.

The air inlets of the housing may be provided in first, second, third, and fourth directions, and opening holes of the door may be formed in each direction to match the air inlets in each direction.

In the housing, the first and second directions may face away from each other, and the third and fourth directions may face away from each other. A line in a direction in which the first and second directions face away from each other and a line in a direction in which the third and fourth directions face away from each other may face different directions.

Separation distances between the opening holes of the air inlets may be disposed differently in the first direction and the second direction.

Separation distances between the opening holes of the air inlets may be disposed equally in the third direction and the fourth direction.

Two opening holes may be formed in each of the air inlets in the first and second directions, one of the opening holes of each of the air inlets in the first and second directions may be disposed to face each other, and the remaining opening holes of the air inlets in the first and second directions may be formed at different positions.

Two opening holes may be formed in each of the air inlets in the third direction and the fourth direction, a separation distance between the two opening holes may be disposed equally, and the two opening holes may be formed to have a separation distance different from that between the opening holes of the air inlet in the first direction and that between the opening holes of the air inlet in the second direction.

One of the opening holes of the air inlets in the third and fourth directions may be formed at the same positions as that of the opening holes positioned to face each other of the air inlets in the first and second directions, and the remaining opening holes of the air inlets in the third and fourth directions may be formed at different positions as those of the opening holes of the air inlets in the first and second directions.

The first direction may be a front side of the vehicle, the second direction may be a rear side of the vehicle, and the third and fourth directions may be lateral sides of the vehicle.

The heat exchange unit may include a heat exchanger and a blower.

The housing may be provided with a driving unit connected to the door and configured to control a vertical position of the door.

According to another aspect, there is provided an air conditioning system for a vehicle, which includes a housing in which an air inlet and an air outlet are provided, the air inlet being provided as a plurality of air inlets in multiple directions, where a plurality of opening holes are formed in each air inlet of the plurality of air inlets. The air conditioning system also includes a heat exchange unit provided inside the housing and a door which is movably installed in the housing and in which a plurality of opening holes selectively matched to the opening holes of each air inlet according to a movement position of the door are formed. The air conditioning system also includes a driving unit connected to the door in the housing and configured to control a vertical position of the door and a controller configured to control the driving unit to adjust a position of the door, wherein the opening holes of each air inlet or the opening holes formed in each direction of the door are formed in different numbers or different separation distances in each direction so that one or more opening holes among the plurality of air inlets are opened according to the position of the door.

The controller may receive information on a driving direction and a driving speed of the vehicle and control opening and closing of the opening holes of each air inlet according to the driving direction and the driving speed.

The controller may control the position of the door to open the air inlets in a direction which matches the driving direction of the vehicle.

When it is determined that the vehicle is in a stopped state, the controller may control the position of the door to open at least some of the opening holes of all the air inlets.

When it is determined that the driving speed is a low-speed, the controller may control the position of the door to open the air inlets in a direction opposite to the air inlets in the driving direction.

When it is determined that the driving speed is a high-speed, the controller may control the position of the door to open the air inlets in the driving direction.

According to another aspect, there is provided a control method using an air conditioning system for a vehicle, which includes a first determination operation of determining whether heat management is performed through the heat exchange unit, including indoor air conditioning or a heat pump, a second determination operation of determining a driving direction and a driving speed of the vehicle, and a control operation of controlling a position of the door to open the air inlets in a direction which matches the driving direction of the vehicle.

In the control operation, when it is determined that the vehicle is in a stopped state, the position of the door may be controlled to open at least some of the opening holes of all the air inlets; when it is determined that the driving speed is a low-speed, the position of the door may be controlled to open the air inlets in a direction opposite to the air inlets in the driving direction; and when it is determined that the driving speed is a high-speed, the position of the door may be controlled to open the air inlets in the driving direction.

BRIEF DESCRIPTION OF THE DRAWINGS

The accompanying drawings are intended to aid in the understanding of embodiments of the present disclosure and provide embodiments along with detailed descriptions. However, the technical features of these embodiments are not limited to specific drawings, and the features disclosed in each drawing may be combined to form a new embodiment, in which.

DETAILED DESCRIPTION

Figure 1:
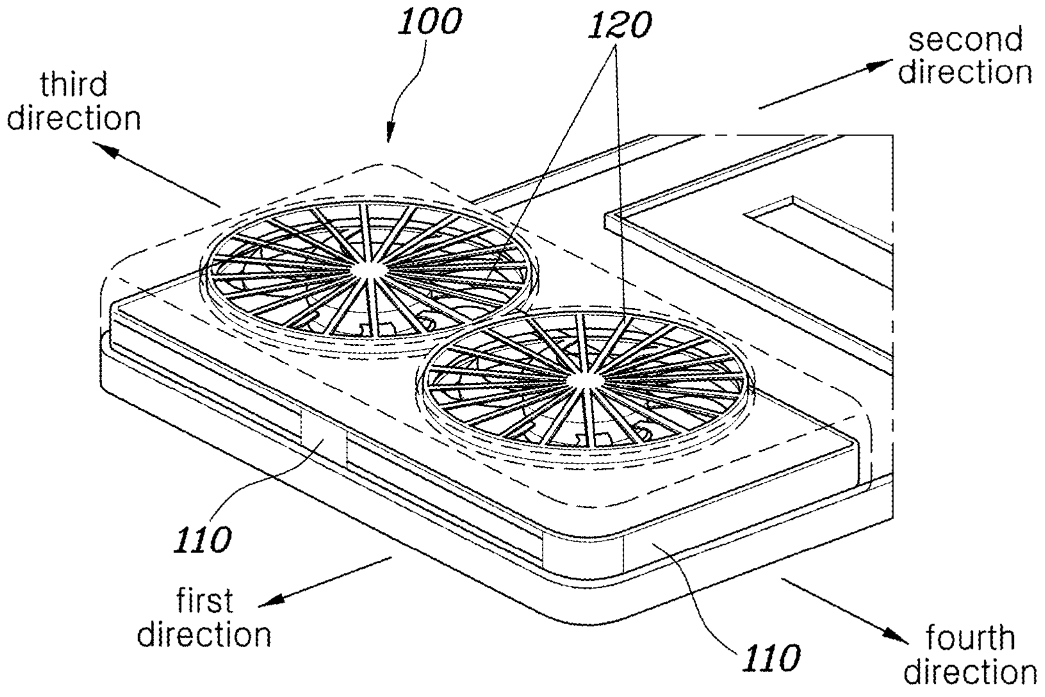
FIG. 1 is a diagram illustrating an air conditioning device for a vehicle according to one embodiment of the present disclosure.

Hereinafter, embodiments disclosed in the present specification are described in detail with reference to the drawings. The same reference numerals are given to the same or similar components regardless of reference numerals, and a repetitive description thereof have been omitted.

As used in the following description, suffixes "module" and "part" for a component are used or interchangeably used solely for ease of preparation of the specification, and do not have different meanings and each of them does not function by itself.

In describing embodiments disclosed in the present specification, when a detailed description of a known related art is determined to obscure the gist of the present specification, the detailed description thereof has been omitted herein. In addition, the accompanying drawings are merely for easy understanding of the embodiments disclosed in the present specification, the technical spirit disclosed in the present specification is not limited by the accompanying drawings, and it should be understood to include all modifications, equivalents, and substitutes included in the spirit and scope of the present disclosure.

Terms including ordinal numbers such as first, second, and the like used herein may be used to describe various components, but the various components are not limited by these terms. The terms are used only for the purpose of distinguishing one component from another component.

When a component is referred to as being "connected" or "coupled" to another component, the component may be directly connected or coupled to another component, but it should be understood that another component may be present between the component and another component. Conversely, when a component is referred to as being "directly connected" or "directly coupled" to another, it should be understood that another component may not be present between the component and another component.

Unless the context clearly dictates otherwise, the singular form includes the plural form.

In the present specification, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

A controller may include a communication device for communicating with other control units or sensors to control a responsible function, a memory for storing an operating system, a logic command, and input/output information, and one or more processors for performing determination, calculation, and decision which are necessary for controlling the responsible function.

Hereinafter, an air conditioning device and system for a vehicle and a control method using the same according to embodiments of the present disclosure are described with reference to the accompanying drawings.

Figure 2:
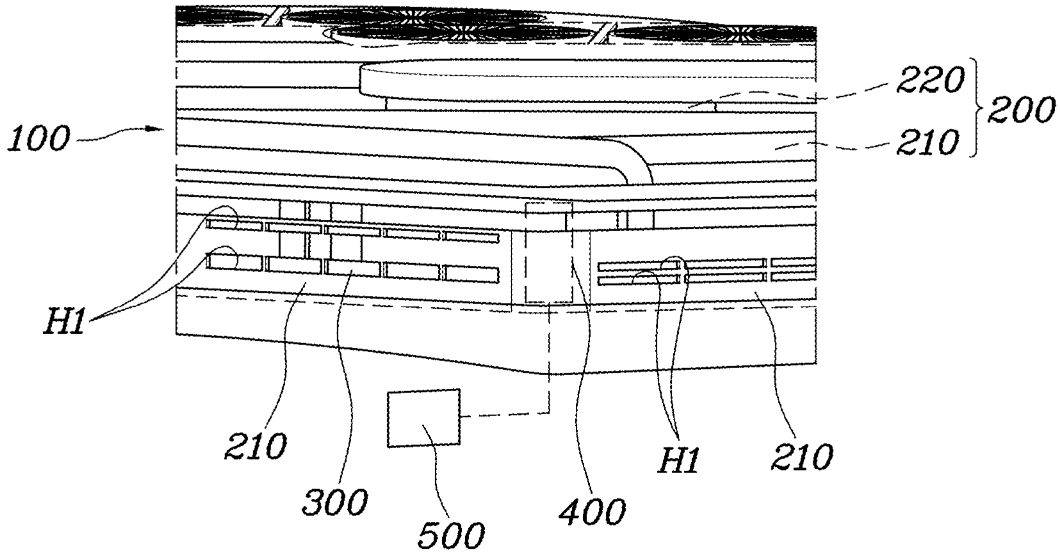
FIG. 2 is a diagram illustrating the air conditioning device for a vehicle shown in FIG. 1.

As shown in FIGS. 1 and 2, the air conditioning device for a vehicle according to the present disclosure includes a housing 100 which is provided with an air inlet 110 and an air outlet 120. The air inlet 110 is provided as a plurality of air inlets 110 in multiple directions and a plurality of opening holes H1 are formed in each air inlet 110. A heat exchange unit 200 is provided inside the housing 100, and a door 300 which is movably installed in the housing 100 and in which a plurality of opening holes H2 selectively matching the opening holes H1 of each air inlet 110 according to a movement position are formed.

The housing 100 is installed at the top of the vehicle and may be formed as a loop-type air conditioning system.

The housing 100 is provided with the plurality of air inlets 110 through which air is introduced and air outlets 120 through which the air introduced into the housing 100 is discharged. The plurality of air inlets 110 may be formed to face different directions in the housing 100 to allow air to be introduced from multiple directions.

Thus, according to the present disclosure, the air may be introduced into an interior of the housing 100 in any direction of the vehicle, and to this end, the plurality of air inlets 110 may be formed along a circumference of the housing 100.

In this way, the air may be introduced into the housing 100 not only to a front side of the vehicle, but also to left, right, and rear sides through the air inlets 110 so that the air may be introduced into the interior of the housing 100 regardless of a driving direction of the vehicle.

The plurality of opening holes H1 are formed in each air inlet 110 to allow the air to flow through the opening holes H1. The air flowing in and out of the housing 100 may be outdoor air.

The heat exchange unit 200 may be provided inside the housing 100 and may include a heat exchanger 210 and a blower 220. The heat exchanger 210 is an outdoor heat exchanger and may be formed to circulate refrigerant, and the blower 220 may be formed to forcefully blow air. The heat exchanger 210 exchanges heat with the outdoor air flowing inside the housing 100, thereby enabling a heat pump to be implemented in connection with refrigerant circulation components provided in a refrigerant circuit.

The door 300 for opening and closing the air inlets 110 is installed in the housing 100. The door 300 may be movably provided inside the housing 100 to open and close the air inlets 110. Thus, the door 300 may be formed in the form of a frame extending along an inner circumference of the housing 100.

In addition, the plurality of opening holes H2 matching the opening holes H1 of the air inlet 110 are formed in the door 300. In other words, the plurality of opening holes H2 are formed along a circumference of the door 300, and each opening hole H2 is selectively matched to a respective opening holes H1 of each air inlet 110 according to a movement position of the door 300 so that the introduction direction of the air into the housing 100 may be changed according to the movement position of the door 300.

In this way, the door 300 opens or closes each opening hole H1 of an air inlet 110 according to the movement position of the door 300. Since a space is formed inside the door 300, interference with other parts including the heat exchange unit 200 may be avoided.

The housing 100 may be provided with a driving unit 400 which is connected to the door 300 and adjusts a vertical position of the door 300.

In other words, the position of the door 300 is moved by the driving unit 400, and the driving unit 400 is installed inside the housing 100 and connected to the door 300. The driving unit 400 has an operating structure for generating a driving force to adjust the position of the door 300, and various power transmission structures such as a gear connection structure and an actuator connection structure may be applied as the operating structure. An operation of the driving unit 400 is controlled by a controller 500, and an amount of outdoor air introduced into the housing 100 may be determined according to the movement position of the door 300 by the driving unit 400.

In particular, in the present disclosure, the opening holes H1 of each air inlet 110 or the opening holes H2 formed in each direction of the door 300 are formed in different numbers or different separation distances in each direction so that one or more opening holes H1 among the plurality of air inlets 110 may be opened according to the position of the door 300.

A description of the present disclosure herein is made such that the number or separation distance of the opening holes H1 formed in each direction of the air inlet 110 are formed differently, and the number or separation distance of the opening holes H2 formed in each direction of the door 300 are formed to be the same.

In this way, the opening holes H1 of each air inlet 110 are formed in different numbers or different separation distances so that one or more opening holes H1 among the plurality of air inlets 110 may be opened according to the position of the door 300.

In other words, when the number or formation position of the opening holes H1 in the air inlet 110 in each direction is different and when the position of the door 300 is moved, the opening holes H1 of the air inlet 110 and the opening holes H2 of the door 300 may match in a direction to become an opened state, and the opening holes H1 of the air inlet 110 and the opening holes H2 of the door 300 may be misaligned in another direction to become a closed state. Consequently, according to the present disclosure, the direction in which air is introduced into the housing 100 is changed in various directions using one door 300.

To describe the present disclosure in detail, each air inlet 110 may have a different number or separation distance of the opening holes H1, or some air inlets 110 may have the same number or separation distance of the opening holes H1.

In the door 300, the opening holes H2 may be formed with the same number and at the same position in each direction.

In this way, since the opening holes H1 are formed in each air inlet 110 in each direction, and since some air inlets 110 have a different number or different separation distances of the opening holes H1, at a specific position of the door 300, the opening holes H2 of the door 300 may be matched to the opening holes H1 of one air inlet 110, whereas the opening holes H2 of the door 300 may be misaligned to the opening holes H1 of another air inlet 110.

In addition, in the case of some air inlets 110, since the opening holes H1 are formed to have the same number or separation distance, at another specific position of the door 300, the opening holes H2 may be simultaneously matched to the opening holes H1 having the same number or separation distances among the air inlets 110 in different directions.

In this way, the direction in which the air is introduced into the housing 100 may be changed in various directions according to the position of the door 300, and the introduction direction of the air may be selectively changed to multiple directions rather than one direction so that the introduction direction of the air may be diversified.

According to one embodiment according to the present disclosure, as can be seen in FIGS. 1-8, the housing 100 may be formed such that the air inlets 110 are provided in first, second, third, and fourth directions, and the opening holes H2 are formed in the door 300 in each direction to match the air inlets 110 in each direction.

In this way, the air inlets 110 of the housing 100 may be formed in four directions, and this is one example according to the present disclosure and the present disclosure is not limited thereto, and the formation directions of the air inlets 110 may be diversified by adding or reducing formation directions.

In the housing 100 of the present disclosure, the first direction and the second direction may face away from each other, and the third direction and the fourth direction may face away from each other. A line in which the first direction and the second direction face away from each other and a line in which the third direction and the fourth direction face away from each other may face different directions.

In other words, in the directions according to one embodiment of the present disclosure, the first direction may be a front side of the vehicle, the second direction may be a rear side of the vehicle, and the third and fourth directions may be a left side and a right side of the vehicle, respectively.

In this way, the housing 100 may be disposed such that the air inlet 110 in the first direction and the air inlet 110 in the second direction face each other in a front-rear direction, and the air inlet 110 in the third direction and the air inlet 110 in the fourth direction face each other in a lateral direction.

Thus, according to the present disclosure, the air may be introduced into the housing 100 not only to the front side of the vehicle, but also to the left, right, and rear sides so that the air may be introduced into the interior of the housing 100 regardless of the driving direction of the vehicle. In addition, even in the case of driving in a diagonal direction, the opening holes H1 may be opened in the air inlets 110 in the diagonal direction so that the amount of air introduced into the housing 100 may be secured.

The door 300 may be formed to match an internal shape of the housing 100 in order to match the air inlets 110 in each direction, and the opening holes H2 matching the opening holes H1 of each air inlet 110 may be formed along a circumference. In the door 300 of the present disclosure, the same number and positions of the opening holes H2 may be formed in each direction.

In the present disclosure, a separation distance between the opening holes H1 may be disposed differently in the first direction and the second direction.

In this way, in the air inlet 110 in the first direction and the air inlet 110 in the second direction, the separation distance between the opening holes H1 is disposed differently, and thus both of the air inlets 110 in the first and second directions may be opened or closed according to the position of the door 300, or only one of the air inlets 110 of the first direction and the second direction may be opened or closed.

In other words, most driving situations of the vehicle are forward or backward driving, and the introduction of air may be varied in the first and second directions to optimally introduce air into the housing 100 according to each driving situation.

The separation distance between the opening holes H1 may be disposed equally in the third direction and the fourth direction.

In this way, in the air inlet 110 in the third direction and the air inlet 110 in the fourth direction, the separation distance between the opening holes H1 is disposed equally, and thus both air inlets 110 in the third and fourth directions may be opened or closed simultaneously according to the position of the door 300.

In other words, a situation in which the vehicle is driven laterally is a special situation and high-speed driving may be limited. Therefore, in the third and fourth directions, the opening holes H1 are opened and closed simultaneously so that a complicated control and structure are simplified to be optimized.

Figure 3:
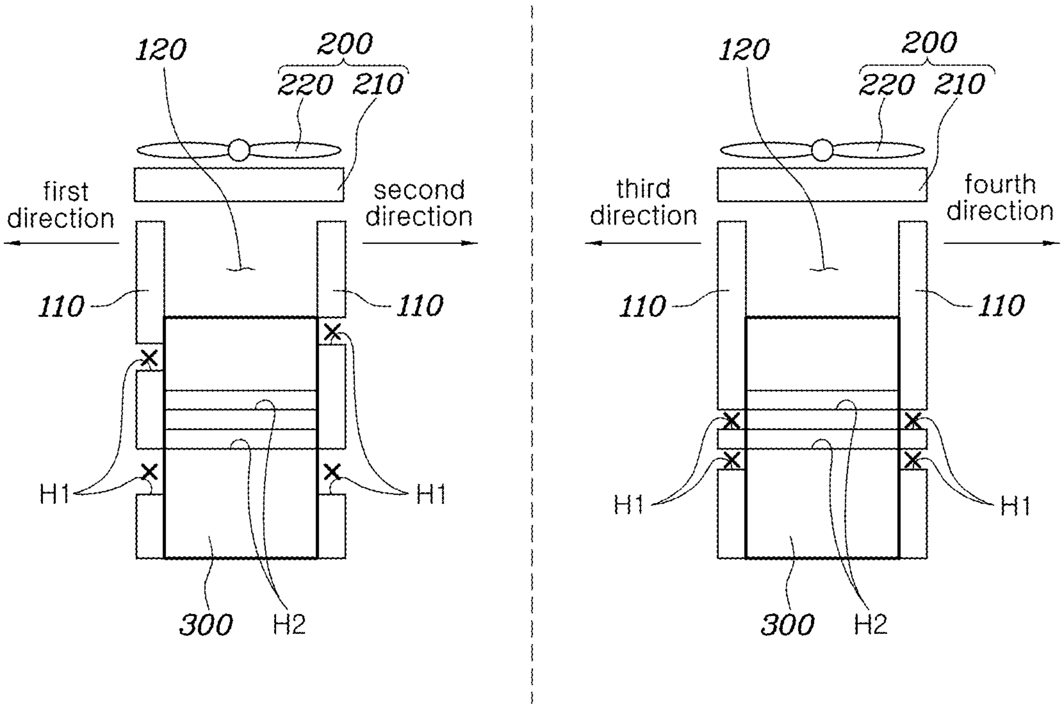
FIG. 3 is a diagram illustrating a state in which air inlets in all directions are closed in the air conditioning device for a vehicle shown in FIG. 1.

To describe one embodiment according to the present disclosure in detail, as shown in FIG. 3, the air inlets 110 in the first direction and the second direction may each include two opening holes H1. Any one among each set of the opening holes H1 of the air inlets 110 face each other, and the remaining opening holes H1 may be formed at different positions. In the embodiment shown at the left side of FIG. 3, the opening holes H1 near the bottom of the air inlets 110 in the first and second direction directly face each other (i.e., are aligned vertically within respective air inlets 110 in the first and second direction), while the opening holes H1 near the middle or top of the air inlets 110 in the first and second direction are formed at different positions (i.e., do not directly face each other since they are not aligned vertically within respective air inlets 110 in the first and second direction).

In the door 300, two opening holes H2 may be formed in each direction and have the same separation distance.

In this way, the air inlet 110 in the first direction and the air inlet 110 in the second direction may be opened or closed in both the first and second directions or opened or closed in either the first direction or the second direction according to the position of the door 300.

As shown on the right side of FIG. 3, two opening holes H1 may be formed in each of the air inlets 110 in the third direction and the fourth direction, a separation distance between the two opening holes H1 may be disposed equally, and the two opening holes H1 may be formed to have a separation distance different from that between the opening holes H1 of the air inlet 110 in the first direction and that between the opening holes H1 of the air inlet 110 in the second direction.

In this way, the air inlet 110 in the third direction and the air inlet 110 in the fourth direction may be opened or closed in both the third and fourth directions according to the position of the door 300. In particular, the opening holes H1 of the air inlet 110 in the third direction and the air inlet 110 in the fourth direction are formed to have a separation distance different from the separation distance between the opening holes H1 of the air inlet 110 in the first direction and the air inlet 110 in the second direction so that the opening or closing operation may be implemented at a timing different from the opening or closing timing in the first and second directions according to the position of the door 300.

In addition, any one of the opening holes H1 of the air inlets 110 in the third and fourth directions is formed at the same position (i.e., same vertical alignment) as those of the opening holes H1 positioned to face each other of the air inlets 110 in the first and second directions, and the remaining opening holes are formed at different positions.

In this way, the opening operation of each air inlet 110 in the first, second, third, and fourth directions may be implemented by matching the opening holes H1 to the opening holes H2 of the door 300 according to the position of the door 300. In addition, the air inlets 110 in the third and fourth directions may be opened or closed at timings different from those of the air inlets 110 in the first and second directions.

In this way, according to the present disclosure, the opening and closing operations in each direction according to the position of the door 300 may be implemented variously by adjusting the formation positions of the opening holes H1 of each air inlet 110 in the first, second, third, and fourth directions.

Therefore, the opening and closing operations in each direction according to the position of the door 300 of the present disclosure may be implemented as follows.

The door 300 is configured to change its position in the vertical direction, and the opening holes H1 of each air inlet 110 are formed to have different separation distances in the vertical direction. In addition, the opening holes H2 of the door 300 are formed to have the same separation distance in all directions.

As shown in FIG. 3, at an initial position of the door 300, the opening holes H2 of the door 300 in each direction does not match the opening holes H1 of the air inlets 110 in all directions, and thus the opening holes H1 in all directions are blocked.

Figure 4:
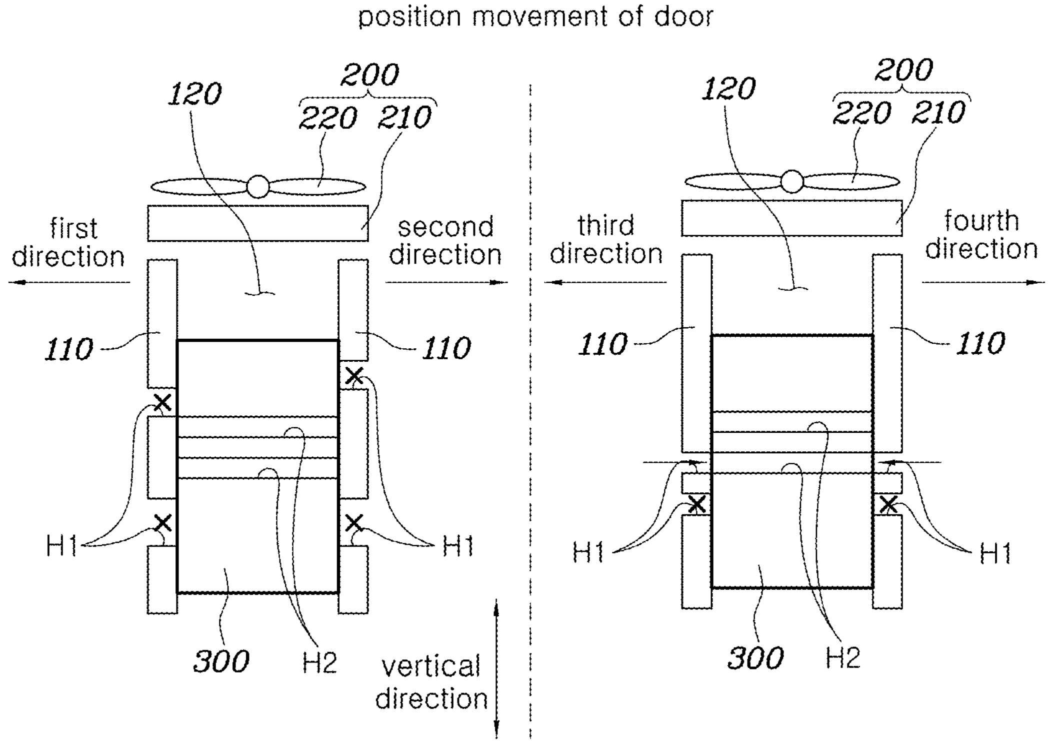
FIG. 4 is a diagram illustrating a state in which air inlets in third and fourth directions are opened in the air conditioning device for a vehicle shown in FIG. 1.

As shown in FIG. 4, when the door 300 moves and at least one of the opening holes H2 of the door 300 match some of the opening holes H1 of the air inlets 110 in the third and fourth directions, a state in which air introduction is possible in the third and fourth directions is achieved. In other words, in a state in which the air may only be introduced in a lateral direction, positions of the opening holes H1 of the air inlets 110 in the first and second directions are different from those of the opening holes H1 of the air inlets 110 in the third and fourth direction to become a closed state.

Figure 5:
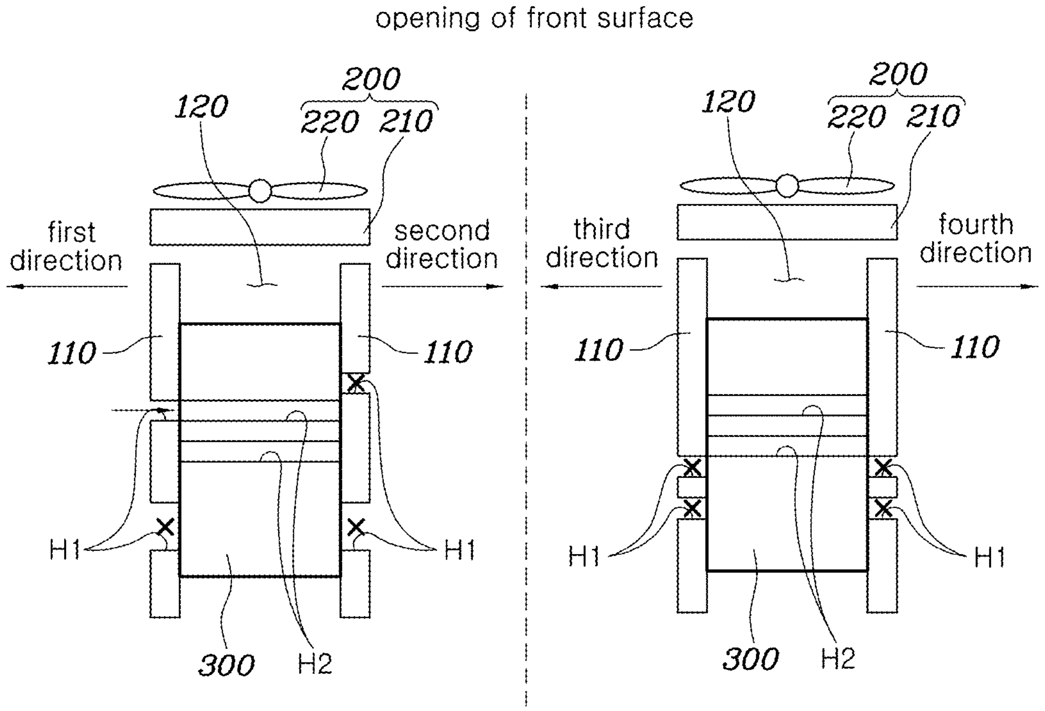
FIG. 5 is a diagram illustrating a state in which an air inlet in a first direction is opened in the air conditioning device for a vehicle shown in FIG. 1.

As shown in FIG. 5, when the door 300 moves and at least one of the opening holes H2 of the door 300 match at least one of the opening holes H1 of the air inlets 110 in the first direction, a state in which the air introduction is possible only in the first direction is achieved. In other words, in a state in which the air may only be introduced from the front side of the vehicle, the opening holes H1 of the air inlets in the second, third, and fourth directions do not match the opening holes H2 of the door 300 and become a closed state.

Figure 6:
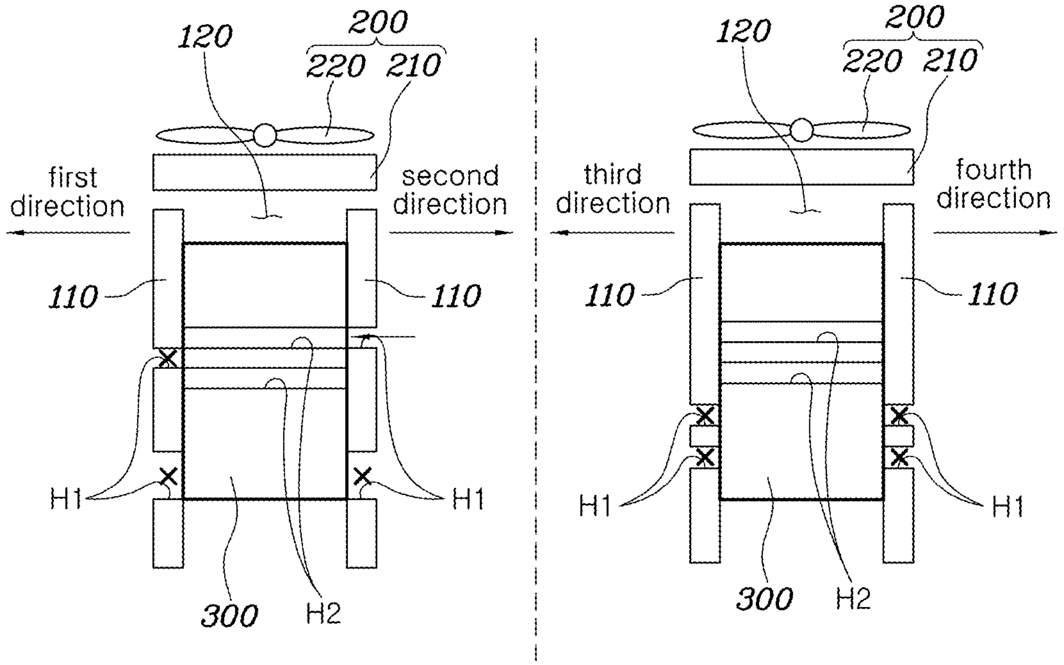
FIG. 6 is a diagram illustrating a state in which an air inlet in a second direction is opened in the air conditioning device for a vehicle shown in FIG. 1.

As shown in FIG. 6, when the door 300 moves and at least one of the opening holes H2 of the door 300 match at least one of the opening holes H1 of the air inlets 110 in the second direction, a state in which the air introduction is possible in the second direction is achieved. In other words, in a state in which the air may only be introduced from the rear side, positions of the opening holes H1 of the air inlets 110 in the first, third, and fourth directions are different from those of the opening holes H2 of the door 300 and become a closed state.

Figure 7:
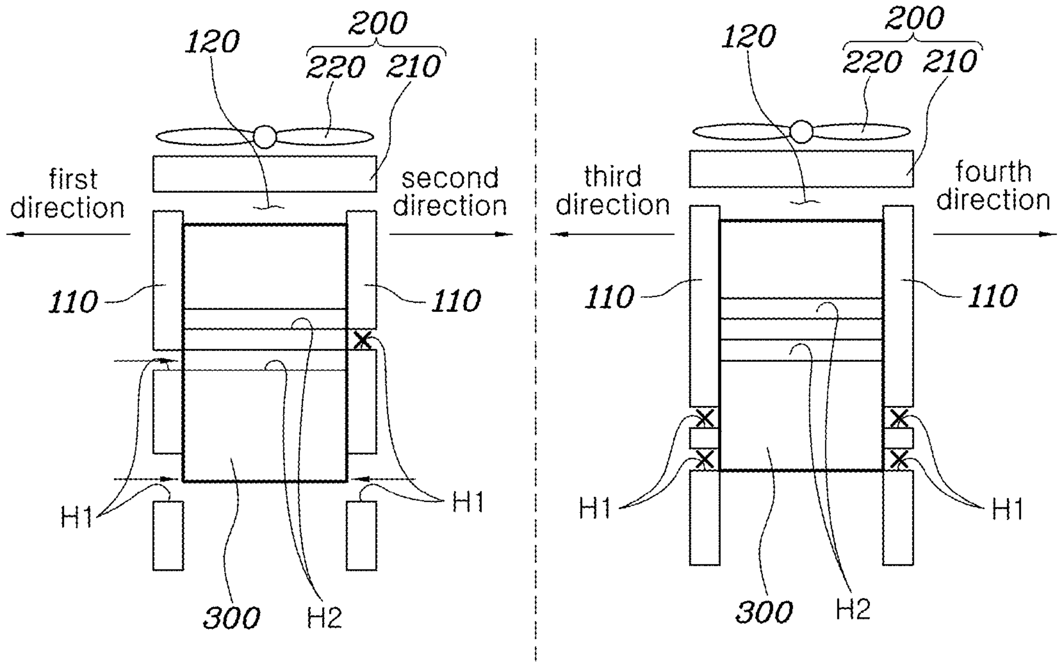
FIG. 7 is a diagram illustrating a state in which the air inlets in the first and second directions are opened in the air conditioning device for a vehicle shown in FIG. 1.

As shown in FIG. 7, when the door 300 moves and some of the opening holes H2 of the door 300, as well as the bottom of the door 300, match some of the opening holes H1 of the air inlets 110 in the first and second directions, a state in which air introduction is possible in the first and second directions is achieved. In other words, in a state in which the air may only be introduced from the front and rear sides, the opening holes H1 of the air inlets in the third and fourth directions do not match the opening holes H2 of the door 300 and become a closed state. In addition, in a state in which the air introduction from the front and rear sides is possible, in order to secure the amount of air introduction from the front side which is the driving direction of the vehicle, all the opening holes H1 of the air inlets 110 in the first direction are configured to match the opening holes H2 or the bottom of the door 300 so that the amount of air introduction can be secured.

Figure 8:
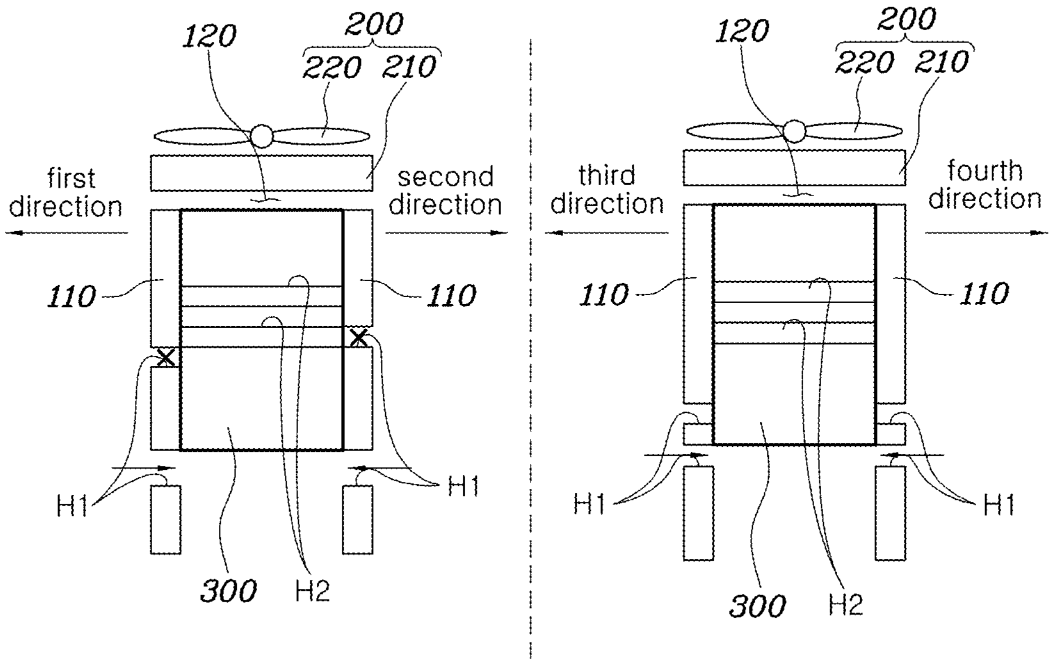
FIG. 8 is a diagram illustrating a state in which the air inlets in all the directions are opened in the air conditioning device for a vehicle shown in FIG. 1.

As shown in FIG. 8, as the door 300 moves, the opening formed or caused by the bottom of the door 300 in each direction match some of the opening holes H1 of the air inlets 110 in all directions so that some of the opening holes H1 in all directions are opened. Therefore, the air may be introduced in all directions such as the front, rear, left, and right sides.

In this way, according to the present disclosure, heat exchange efficiency through the heat exchange unit 200 can be improved by changing the direction in which the air is introduced into the housing 100 according to the position of the door 300 and optimizing air introduction for each driving situation.

An air conditioning system for a vehicle according to the present disclosure includes the housing 100 which is provided with an air inlet 110 and an air outlet 120 and in which the air inlet 110 is provided as a plurality of air inlets 110 in multiple directions and a plurality of opening holes H1 are formed in each air inlet 110. The air conditioning system also includes the heat exchange unit 200 provided inside the housing 100 and the door 300 which is movably installed in the housing 100 and in which a plurality of opening holes H2 selectively matching the opening holes H1 of each air inlet 110 according to a movement position are formed. The air conditioning system also includes the driving unit 400 connected to the door 300 and configured to adjust a vertical position of the door 300 in the housing 100, and the controller 500 configured to control the driving unit 400 to adjust the position of the door 300, wherein the opening holes H1 of each air inlet 110 or the opening holes H2 formed in each direction of the door 300 are formed in different numbers or different separation distances in each direction so that one or more opening holes H1 among the plurality of air inlets 110 may be opened according to the position of the door 300.

In this way, the opening holes H1 of each air inlet 110 are formed in different numbers or different separation distances so that one or more opening holes H1 among the plurality of air inlets 110 may be opened according to the position of the door 300.

In other words, when the number or formation position of the opening holes H1 in the air inlet 110 in each direction is different and, when the position of the door 300 is moved, the opening hole(s) H1 of the air inlet 110 and the opening hole(s) H2 of the door 300 may match in a direction to be opened, and the opening hole(s) H1 of the air inlet 110 and the opening hole(s) H2 of the door 300 may be misaligned in another direction to be closed. Consequently, according to the present disclosure, the direction in which the air is introduced is changed in various directions using one door 300.

The controller 500 may receive information on a driving direction and a driving speed of the vehicle and control opening and closing of the opening holes H1 of each air inlet 110 according to the driving direction and the driving speed.

The controller 500 may receive the driving direction information through navigation information, a steering wheel sensor, and the like and receive the driving speed information through a wheel sensor and the like. The controller 500 may collect these pieces of information to control the direction in which the air is introduced through the air inlet 110 in each direction to be switched.

Specifically, the controller 500 may control the position of the door 300 to open the air inlet 110 in a direction corresponding to the driving direction of the vehicle.

In this way, the controller 500 controls the air inlet 110 in the direction corresponding to the driving direction of the vehicle to be opened so that a driving wind may be sufficiently introduced into the housing 100. Consequently, the heat exchange unit 200 can improve heat exchange efficiency by securing the amount of air introduced into the housing 100.

When it is determined that the vehicle is in a stopped state, the controller 500 may control the position of the door 300 to open the opening holes H1 of all the air inlets 110.

In this way, when the vehicle is stopped, the controller 500 controls an opening unit to open the opening holes H1 of the air inlet 110 in all directions so that sufficient air is introduced into the housing 100 even when the vehicle is not driving. Thus, even when the vehicle is stopped, the amount of air introduced around the housing 100 is secured when the blower 220 of the heat exchange unit 200 operates so that the heat exchange efficiency of the heat exchanger 210 is secured.

When it is determined that the driving speed is in a low-speed section or state, the controller 500 may control the position of the door 300 to open the air inlet 110 in a direction opposite to the air inlet 110 in the driving direction.

In this way, in a situation in which the vehicle is driving in the low-speed section or state, the controller 500 controls the position of the door 300 to open the opening hole(s) H1 of the air inlet 110 corresponding to the driving direction and also open the opening hole(s) H1 of the air inlet 110 in the direction opposite to the driving direction so that sufficient air is introduced into the housing 100 even in the low-speed section or state.

When the vehicle is in the low-speed section or state, and when at least one of the opening holes H1 of the air inlet 110 in the lateral direction together with at least one of the opening holes H1 of the air inlet 110 in the driving direction is opened, since driving resistance increases and thus fuel efficiency decreases, at least one opening hole H1 of the air inlet 110 in the direction opposite to the driving direction is opened.

In this way, even in the situation in which the vehicle is driving at low speed, the amount of air introduced into the housing 100 is secured so that the heat exchange efficiency of the heat exchange unit 200 can be secured.

When it is determined that the driving speed is in a high-speed section or state, the controller 500 may control the position of the door 300 to open the air inlet in the driving direction.

In this way, in a situation in which the vehicle is driving in the high-speed section or state, the controller 500 controls the position of the door 300 to open at least one of the opening holes H1 of the air inlet 110 corresponding to the driving direction so that a driving wind is sufficiently introduced into the housing 100.

In this case, when it is determined that the driving speed is in an ultra-high speed section or state, the controller 500 may reduce or block an opening degree of the air inlet 110 in the driving direction to prevent driving performance from being deteriorated.

The low-speed section may be a speed section in which the heat exchange efficiency of the heat exchanger 210 cannot be secured because the driving wind introduced into the housing 100 from a direction in which the vehicle is driving is not sufficient even if the vehicle is driven.

The high-speed section may be a speed section in which the heat exchange efficiency of the heat exchanger 210 is secured because the driving wind introduced from a direction in which the vehicle is driving is sufficient when the mobility is driving.

The ultra-high speed section may be a speed section in which the amount of driving wind introduced in the direction in which the vehicle is driving is excessive, and driving performance may deteriorate, the heat exchanger 210 may be overcooled, or components of the vehicle may be damaged due to the driving wind.

The above-mentioned low-speed section, high-speed section, and ultra-high-speed section can be set based on data tested in advance during design of the vehicle.

Figure 9:
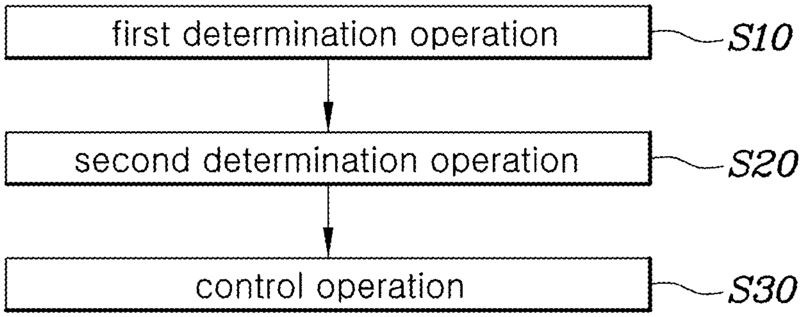
FIG. 9 is a control flowchart of an air conditioning system for a vehicle.

As shown in FIG. 9, a control method according to the air conditioning system for a vehicle of the present disclosure may include a first determination operation (S10) of determining whether heat management is performed through the heat exchange unit 200, including indoor air conditioning or a heat pump, a second determination operation (S20) of determining a driving direction and a driving speed of the vehicle, and a control operation (S30) of controlling the position of the door 300 to open the air inlet 110 in a direction matching the driving direction of the vehicle.

In other words, in the first determination operation (S10), whether heat management is performed through the heat exchange unit 200, including the indoor air conditioning or the heat pump is checked, and it is determined whether to perform control of adjusting an amount of air introduced into the housing 100 according to the position control of the door 300.

In the second determination operation (S20), driving direction information may be received through navigation information, a steering wheel sensor, and the like, and driving speed information may be received through a wheel sensor and the like.

Based on these pieces of information, in the control operation (S30), when the heat management should be performed through the heat exchange unit 200, including the indoor air conditioning or the heat pump, the position of the door 300 is controlled to open the air inlet 110 in the direction matching the driving direction of the vehicle so that the amount of air introduced into the housing 100 is secured to improve heat exchange efficiency of the heat exchange unit 200.

Figure 10:
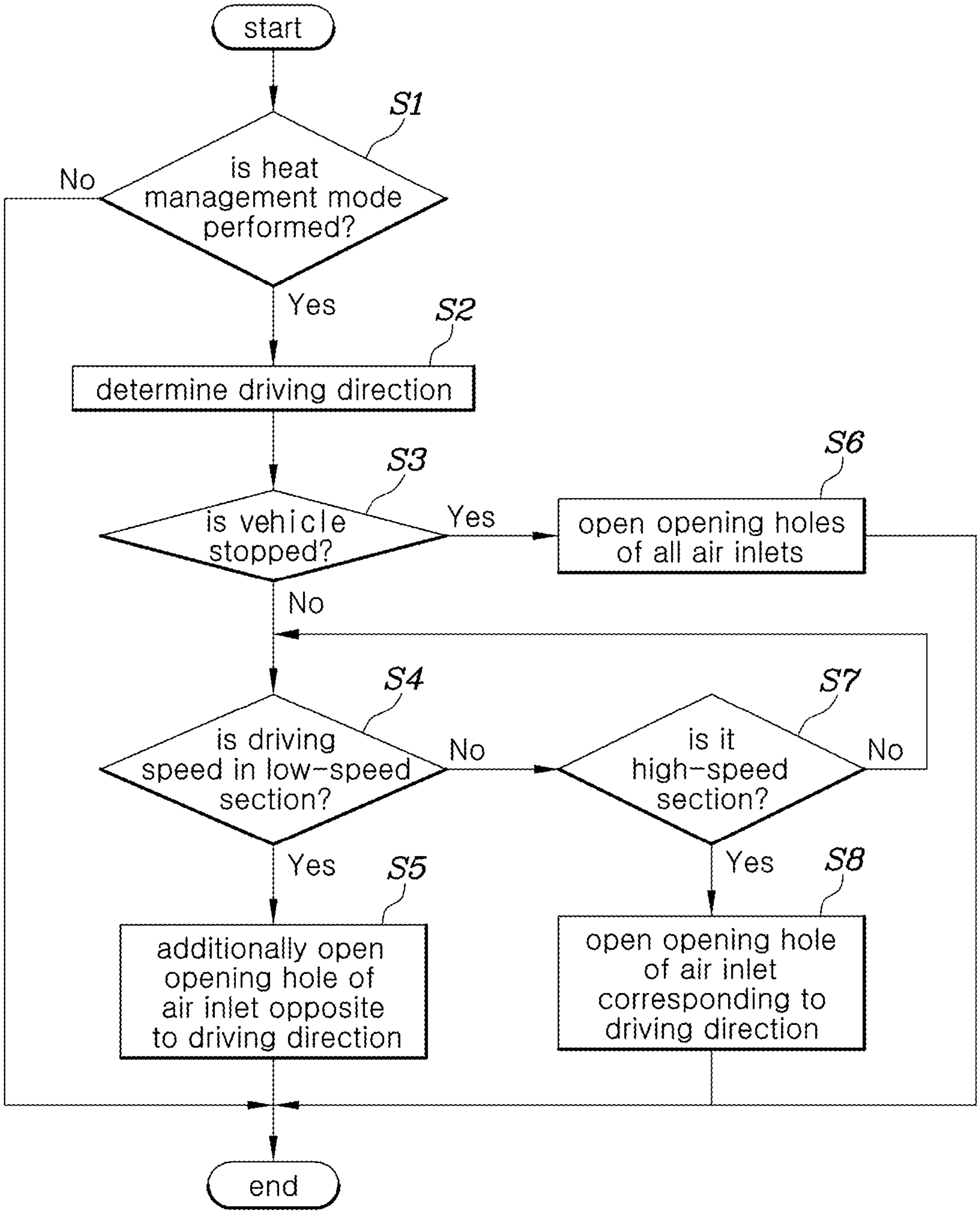
FIG. 10 is a detailed control flowchart of the air conditioning system for a vehicle.

In other words, according to operations S1-S8 of the flowchart shown in FIG. 10, in the control operation (S30), when it is determined that the vehicle is in a stopped state (yes at S3), the position of the door 300 may be controlled to open at least some of the opening holes H1 of all the air inlets 110, and when it is determined that the driving speed is in a low-speed section or state (yes at S4), the position of the door 300 may be controlled to also open the air inlets 110 in a direction opposite to the air inlets 110 in the driving direction. When it is determined that the driving speed is in a high-speed section or state (yes at S7), the position of the door 300 may be controlled to open the air inlets 110 in the driving direction.

The air conditioning device and system for a vehicle, which have the above-described structure, and a control method using the same change the introduction direction of outdoor air provided to the heat exchanger 210 so that the amount of heat exchange between the heat exchanger 210 and the outdoor air is adjusted according to the driving direction or whether a heat pump is used and operating efficiency of the heat exchanger 210 is improved.

According to an air conditioning device and system for a vehicle, which have the above-described structure, and a control method using the same, an introduction direction of outdoor air provided to a heat exchanger is changed so that an amount of heat exchange between the heat exchanger and the outdoor air can be adjusted according to a driving direction or whether a heat pump is used and operating efficiency of the heat exchanger can be improved.

Although the specific embodiments of the present disclosure have been described and illustrated, those having ordinary skill in the art will appreciate that various alternations and modifications are possible without departing from the technical spirit of the present disclosure provided in the appended claims.

What is claimed is:

1. An air conditioning device for a vehicle, the air conditioning device comprising:

a housing having an air inlet and an air outlet, the air inlet being a plurality of air inlets in multiple directions, wherein a plurality of opening holes are formed in each air inlet of the plurality of air inlets;

a heat exchange unit provided inside the housing; and a door movably installed in the housing and including a plurality of opening holes selectively matched to the opening holes of each air inlet according to a movement position of the door, wherein the opening holes of each air inlet or the opening holes formed in each direction of the door are formed in different numbers or different separation distances in each direction so that one or more opening holes among the plurality of air inlets are opened according to a position of the door.

2. The air conditioning device of claim 1, wherein the air inlets are configured to have a different number or separation distance of the opening holes, or some air inlets are configured to have a same number or separation distance of the opening holes.

3. The air conditioning device of claim 1, wherein, in the door, a same number of opening holes in each direction are formed at a same position.

4. The air conditioning device of claim 1, wherein:

the air inlets of the housing are provided in first, second, third, and fourth directions; and opening holes of the door are formed in each direction to match the air inlets in each direction.

5. The air conditioning device of claim 4, wherein:

in the housing, the first and second directions face away from each other, and the third and fourth directions face away from each other; and a line in a direction in which the first and second directions face away from each other and a line in a direction in which the third and fourth directions face away from each other face different directions.

6. The air conditioning device of claim 5, wherein separation distances between the opening holes of the air inlets are disposed differently in the first direction and the second direction.

7. The air conditioning device of claim 5, wherein separation distances between the opening holes of the air inlets are disposed equally in the third direction and the fourth direction.

8. The air conditioning device of claim 5, wherein:

two opening holes are formed in each of the air inlets in the first and second directions; and one of the opening holes of each of the air inlets in the first and second directions is disposed to face each other, and the remaining opening holes of the air inlets in the first and second directions are formed at different positions.

9. The air conditioning device of claim 8, wherein two opening holes are formed in each of the air inlets in the third direction and the fourth direction, a separation distance between the two opening holes is disposed equally, and the two opening holes are formed to have a separation distance different from that between the opening holes of the air inlet in the first direction and that between the opening holes of the air inlet in the second direction.

10. The air conditioning device of claim 9, wherein one of the opening holes of the air inlets in the third and fourth directions is formed at a same position as that of the opening holes positioned to face each other of the air inlets in the first and second directions, and the remaining opening holes of the air inlets in the third and fourth directions are formed at different positions as those of the opening holes of the air inlets in the first and second directions.

11. The air conditioning device of claim 1, wherein the heat exchange unit includes a heat exchanger and a blower.

12. The air conditioning device of claim 1, wherein the housing is provided with a driving unit connected to the door and configured to control a vertical position of the door.

13. An air conditioning system for a vehicle, the air conditioning system comprising:

a housing having an air inlet and an air outlet, the air inlet being a plurality of air inlets in multiple directions, wherein a plurality of opening holes are formed in each air inlet of the plurality of air inlets;

a heat exchange unit provided inside the housing;

a door movably installed in the housing and including a plurality of opening holes selectively matched to the opening holes of each air inlet according to a movement position of the door;

a driving unit connected to the door in the housing and configured to control a vertical position of the door; and a controller configured to control the driving unit to adjust a position of the door, wherein the opening holes of each air inlet or the opening holes formed in each direction of the door are formed in different numbers or different separation distances in each direction so that one or more opening holes among the plurality of air inlets are opened according to the position of the door.

14. The air conditioning system of claim 13, wherein the controller receives information on a driving direction and a driving speed of the vehicle and controls opening and closing of the opening holes of each air inlet according to the driving direction and the driving speed.

15. The air conditioning system of claim 14, wherein the controller controls the position of the door to open the air inlets in a direction which matches the driving direction of the vehicle.

16. The air conditioning system of claim 14, wherein, when it is determined that the vehicle is in a stopped state, the controller controls the position of the door to open at least some of the opening holes of all the air inlets.

17. The air conditioning system of claim 14, wherein, when it is determined that the driving speed is a low-speed, the controller controls the position of the door to open the air inlets in a direction opposite to the air inlets in the driving direction.

18. The air conditioning system of claim 14, wherein, when it is determined that the driving speed is a high-speed, the controller controls the position of the door to open the air inlets in the driving direction.

19. A control method according to the air conditioning system for the vehicle of claim 13, the control method comprising:

a first determination operation of determining whether heat management is performed through the heat exchange unit, including indoor air conditioning or a heat pump;

a second determination operation of determining a driving direction and a driving speed of the vehicle; and a control operation of controlling a position of the door to open the air inlets in a direction which matches the driving direction of the vehicle.

20. The control method of claim 19, wherein:

in the control operation, when it is determined that the vehicle is in a stopped state, the position of the door is controlled to open at least some of the opening holes of all of the air inlets;

when it is determined that the driving speed is a low-speed, the position of the door is controlled to open the air inlets in a direction opposite to the air inlets in the driving direction; and when it is determined that the driving speed is a high-speed, the position of the door is controlled to open the air inlets in the driving direction.

* * * * *